United States Patent
Sohn

(10) Patent No.: US 7,036,572 B2
(45) Date of Patent: May 2, 2006

(54) OIL COOLER STRUCTURE OF AN AUTOMATIC TRANSMISSION

(75) Inventor: Hyun-Soo Sohn, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 10/749,215

(22) Filed: Dec. 30, 2003

(65) Prior Publication Data

US 2005/0098308 A1    May 12, 2005

(30) Foreign Application Priority Data

Nov. 10, 2003    (KR)    ............... 10-2003-0079020

(51) Int. Cl.
*F28D 1/03*    (2006.01)
(52) U.S. Cl. .................................... 165/175
(58) Field of Classification Search ............... 165/152, 165/153, 178
See application file for complete search history.

(56) References Cited

U.S. PATENT DOCUMENTS 3,805,889 A * 4/1974 Coolidge ............... 165/153
4,815,532 A * 3/1989 Sasaki et al. ........... 165/152
5,277,358 A * 1/1994 Cottone et al. .......... 228/219
5,464,056 A * 11/1995 Tajima et al. ........... 165/167
5,538,077 A * 7/1996 So et al. ................. 165/153

FOREIGN PATENT DOCUMENTS

JP            6-73302        3/1994

* cited by examiner

*Primary Examiner*—Teresa J. Walberg

(74) *Attorney, Agent, or Firm*—Morgan Lewis & Bockius LLP

(57) ABSTRACT

The oil cooler structure of an automatic transmission includes an upper tube plate reinforcement and a lower tube plate reinforcement. Each tube plate reinforcement is arranged in a layer in an oil passage formed between a plane of an upper tube plate and a plane of a lower tube plate. Each tube plate reinforcement is also respectively welded to the upper tube plate and the lower tube plate and embossed parts thereof protruding toward the center of the oil passage being mutually abutted and welded therebetween. Accordingly, the assembled rigidity of the upper and lower tube plates is improved, and an entire durability of an oil cooler is enhanced for improved quality.

7 Claims, 4 Drawing Sheets

OIL COOLER STRUCTURE OF AN AUTOMATIC TRANSMISSION

CROSS-REFERENCE TO RELATED APPLICATIONS

This application claims priority to Korean Application No. 10-2003-0079020, filed on Nov. 10, 2003, the disclosure of which is incorporated fully herein by reference.

FIELD OF THE INVENTION

The present invention relates to an oil cooler structure of an automatic transmission and, more particularly, to an oil cooler structure of an automatic transmission adapted to prevent assembly deviation between an upper tube plate and a lower tube plate and to improve an entire durability thereof.

BACKGROUND OF THE INVENTION

An oil cooler is disposed with an upper tube plate and a lower tube plate, each overlapped and welded thereto, to form one plated tube. Generally five to six plated tubes are layered to constitute an oil cooler.

An uppermost plated tube forming an oil cooler is disposed at both distal ends thereof with a pair of nipples for circulating oil. The upper tube plate and the lower tube plate, for forming each plated tube, are respectively mounted with oil holes for communicating with the nipples. Embossed parts are respectively formed at a central area of a plane near the oil holes. The embossed parts function to connect an upper tube plate and a lower tube plate and are coupled by braze welding. Furthermore, the embossed parts also serve to prevent a detachment of assembling positions when inner cooling pins are assembled and also serve to maintain a rigidity of plated tubes at an area where there are no inner cooling pins.

SUMMARY OF THE INVENTION

The present invention provides an oil cooler structure of an automatic transmission wherein a reinforced plate equipped with embossed parts is separately manufactured and the plate is integrally coupled to an upper tube plate and a lower tube plate by way of braze welding to thereby prevent an assembling deviation between the upper tube plate and the lower tube plate, and to allow the embossed parts to be welded via a broad area, thereby increasing the entire durability thereof.

In accordance with a preferred embodiment of the present invention, the oil cooler structure of an automatic transmission comprises an upper tube plate reinforcement and a lower tube plate reinforcement each arranged in a layer in an oil passage formed between a plane of an upper tube plate and a plane of a lower tube plate and respectively welded to the upper tube plate and the lower tube plate and embossed parts thereof protruding toward the center of the oil passage being mutually abutted and welded therebetween.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENT

The preferred embodiment of the present invention will now be described in detail with reference to the accompanying drawings. The present embodiment should not limit the scope of the present invention and is described only for illustrative purpose.

Figure 1:
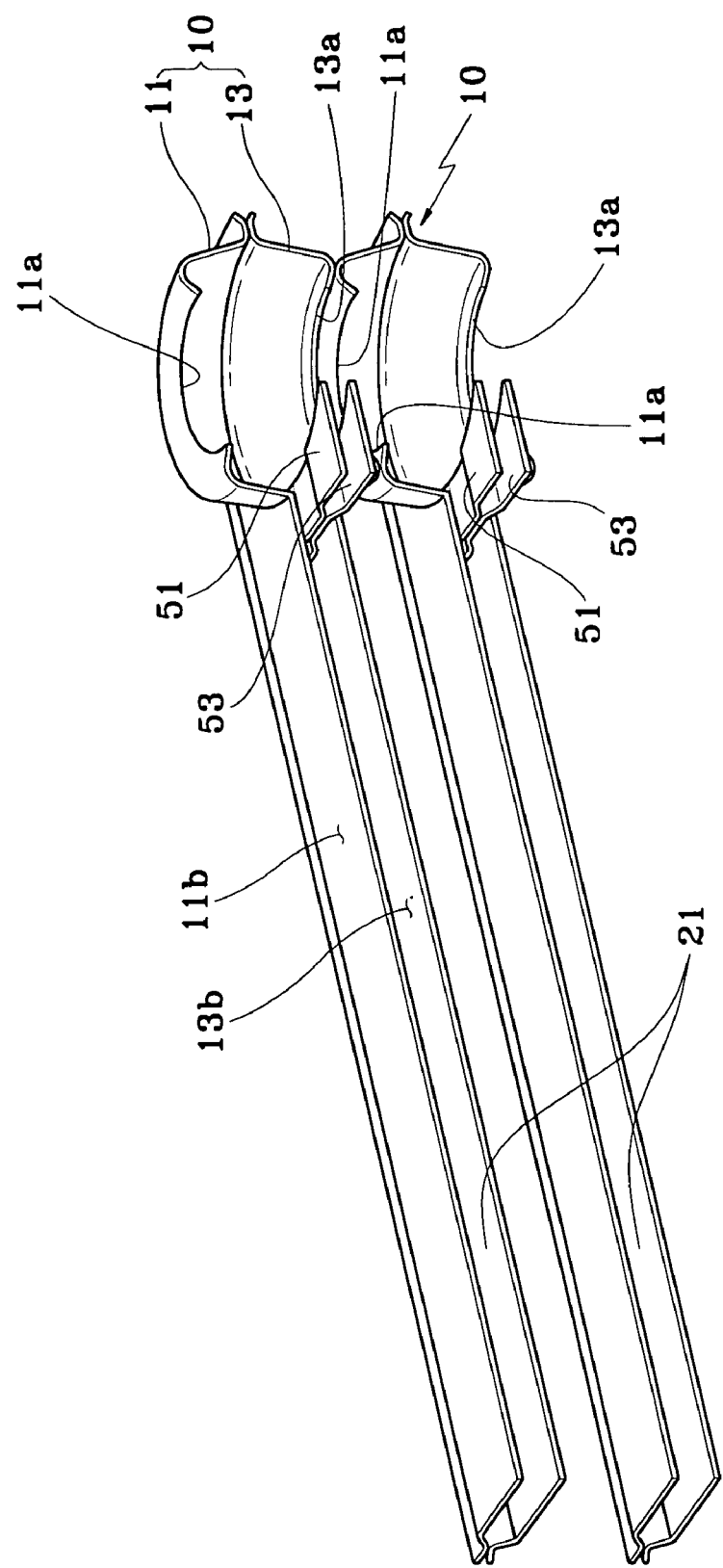
FIG. 1 is a perspective view illustrating a partially cut-out oil cooler in an oil cooler structure of an automatic transmission according to an embodiment of the present invention.
Figure 2:
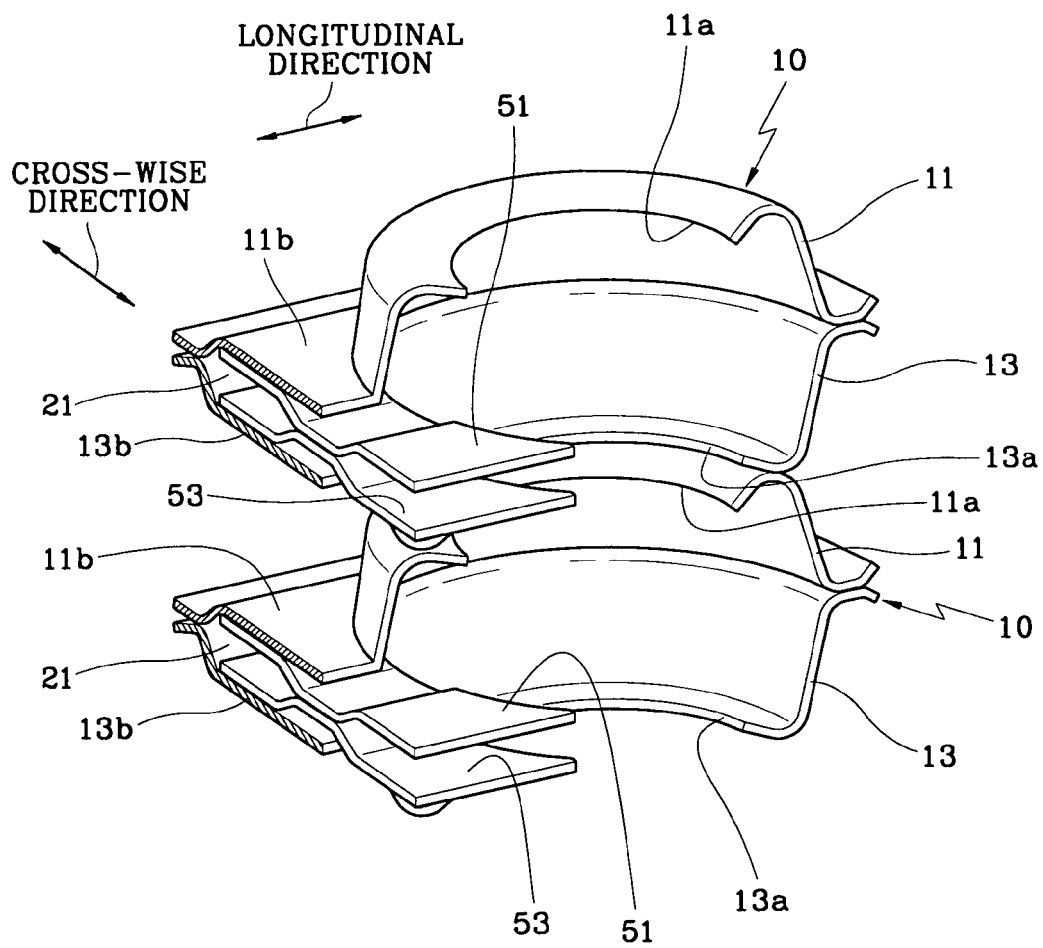
FIG. 2 illustrates essential parts of FIG. 1.
Figure 3:
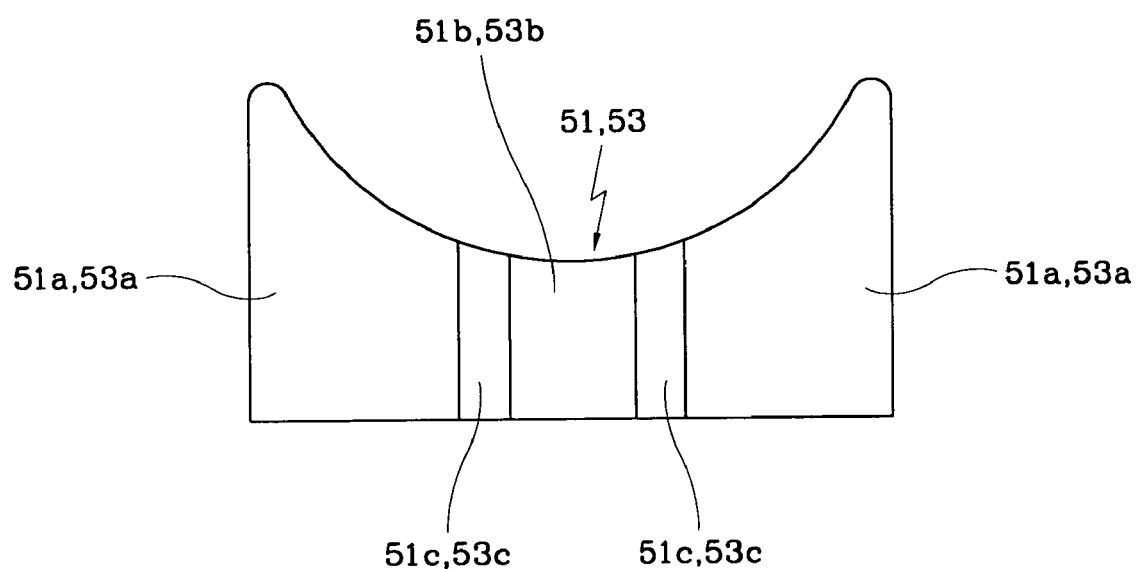
FIG. 3 is a schematic drawing for explaining a structure of upper and lower tube plate reinforcements according to an embodiment of the present invention.
Figure 3:
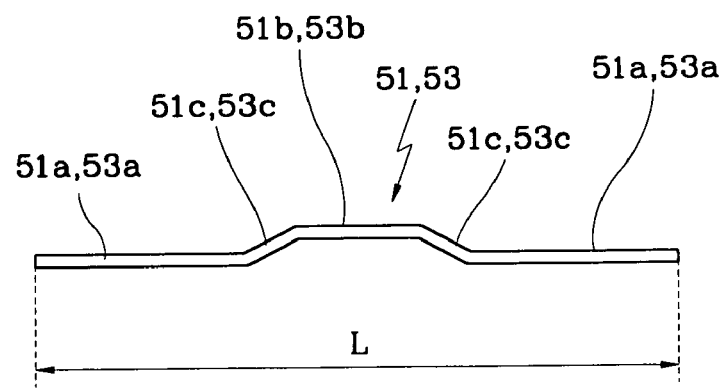
Figure 4:
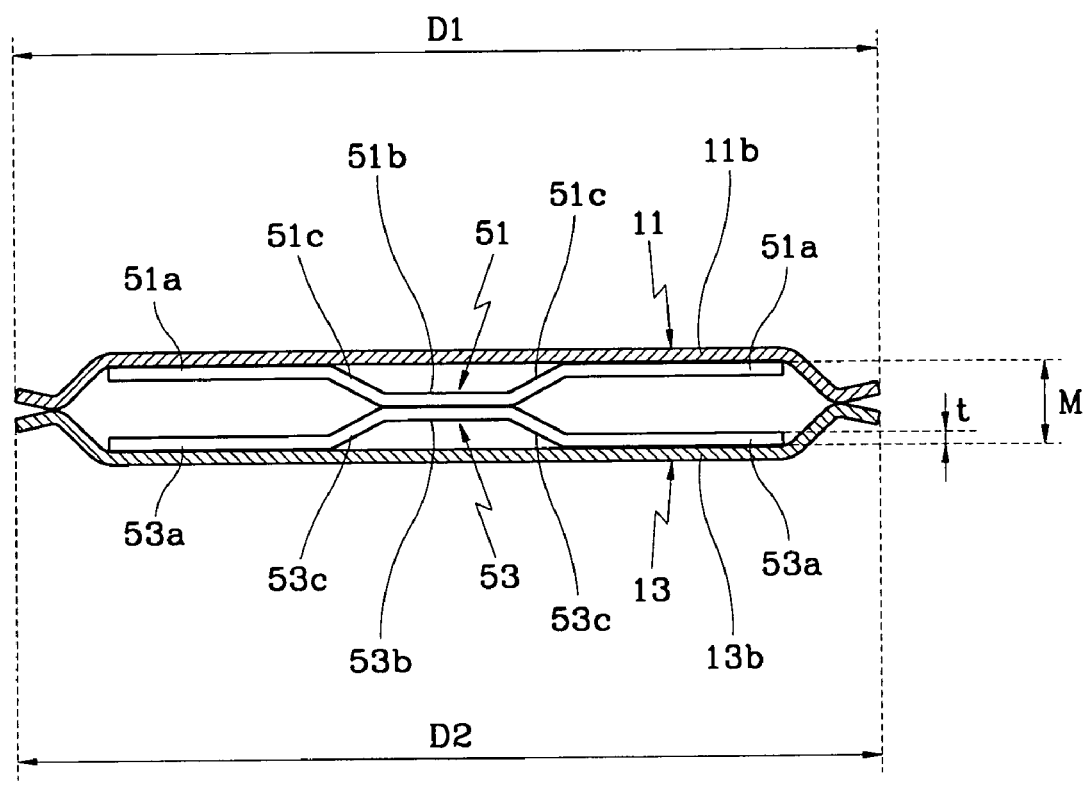
FIG. 4 is a cross-sectional view taken along a crosswise direction of a plate tube in an oil cooler.

As shown in FIG. 1, an upper tube plate 11 and a lower tube plate 13 are overlapped and welded to form one plated tube 10. A plurality of plated tubes 10 are layered and welded to constitute an oil cooler. Oil holes 11a and 13a formed at the upper tube plate 11 and the lower tube plate 13a form a space for oil to circulate therein by way of the layered plurality of plated tubes 10, and the space is connected to an automatic transmission through nipples (not shown).

An oil passage 21 is disposed with an aluminum upper tube plate reinforcement 51 and an aluminum lower tube plate reinforcement 53, as depicted in FIGS. 1 to 4, and is arranged along a width of plane parts 11b and 13b and welded to the upper and lower tube plates 11 and 13 by way of braze welding.

The upper and lower tube plate reinforcements 51 and 53 include welded coupling surfaces 51a and 53a respectively abutted and welded to surfaces of the plane parts 11b and 13b extended from the oil holes 11a and 13a, and embossed parts 51b and 53b protruding from a central portion of the welded coupling surfaces 51a and 53a and distanced from the plane parts 11b and 13b and protruding toward a center of the oil passage 21. The embossed parts 51b and 53b of the upper and lower tube plate reinforcements 51 and 53 are mutually abutted at distal ends thereof and coupled by braze welding.

One marginal surface of the upper and lower tube plate reinforcements is arched to conform to part of the oil holes 11a and 13a of the upper and lower tube plates 11 and 13, and other three marginal surfaces thereof are straightly formed along longitudinal and cross-wise directions of the plane parts 11b and 13b.

Preferably, the embossed parts 51b and 53b formed at the upper and lower tube plate reinforcements are straight plane parts having a length of 3.0 mm to 5.0 mm along a longitudinal (L) direction of the upper and lower tube plate reinforcements 51 and 53, and more preferably having a length of 4.0 mm.

By way of reference, the entire length of the upper and lower tube plate reinforcements 51 and 53 depends on a width (D1 and D2) of the plane parts 11b and 13b, but usually has a length of approximately 25.00 mm.

Preferably, the width (D1 and D2) length of the plane parts 11b and 13b is 2.9 mm. Furthermore, the embossed parts 51b and 53b and the welded coupling surfaces 51a and 53a are connected via slopes 51c and 53c each having a prescribed angle. The slopes 51c and 53b may respectively be formed in a straight plane shape or in an arched shape.

The thickness (t) of the upper and lower tube plate reinforcements 51 and 53 is formed to have 0.2 times of a gap (M) between inner surfaces of the plane parts 11b and 13b. In other words, the gap (M) between the inner surfaces of the plane parts 11b and 13b is 3.0 mm, and each thickness (t) of the upper and lower tube plate reinforcements 51 and 53 is formed to have 0.6 mm. As a result, a space of 1.8 mm is formed between the welded coupling surfaces 51a and 53a of the upper and lower tube plate reinforcements 51 and 53.

The upper and lower tube plate reinforcements 51 and 53 connect the upper and lower tube plates 11 and 13 via the embossed parts 51b and 53b to carry out the function of maintaining the rigidity of the plated tubes 10, and simultaneously carry out a function of preventing detachment of assembling positions of inner cooling pins (not shown) when the inner cooling pins are assembled.

Meanwhile, the upper tube plate 11, the lower tube plate 13 and the upper and lower tube plate reinforcements 51 and 53 are all made of aluminum thin plates via pressing process, and the upper tube plate 11 and the lower tube plate 13 are integrally formed with the oil holes 11a and 13a when they are pressed for forming.

In the oil cooler structure according to the present invention, the upper and lower tube plate reinforcements 51 and 53 equipped with protruding embossed parts 51b and 53b, each having a sufficient area, are separately manufactured to be respectively coupled to the upper and lower tube plates 11 and 13 by way of a braze welding method. This prevents a decrease in rigidity and durability of an oil cooler, where these decreases are generated by insufficient protruding areas of embossed parts, and shrunken local surfaces of upper and lower tube plates generated by the embossed parts being integrally pressed to the embossed parts can be prevented. As a result, the durability of an oil cooler can be increased across the board.

As apparent from the foregoing, there are advantages in the oil cooler structure of an automatic transmission thus described according to the embodiment of the present invention in that upper and lower tube plate reinforcements equipped with protruding embossed parts each having a sufficient area are separately manufactured to be respectively coupled to the upper and lower tube plates by way of a braze welding method. A decrease in rigidity and durability of an oil cooler can be prevented, where these decreases are generated by insufficient protruding areas of embossed parts, and shrunken local surfaces of upper and lower tube plates generated by the embossed parts being integrally pressed to the embossed parts can be prevented. The durability of an oil cooler can be increased across the board.

What is claimed is:

1. An oil cooler structure of an automatic transmission comprising:
    an upper tube elate and a lower tube plate together forming an oil circulation space defining oil holes at a top and a bottom:
    an oil passage defined by an upper tube plate plane part and a lower tube plate plane part, said oil passage communicating with said oil circulation space intermediate of said top and bottom oil holes and extending longitudinally for a first distance; and
    an upper tube plate reinforcement and a lower tube plate reinforcement each arranged in a layer in said oil passage formed between the plane part of the upper tube plate and the plane part of the lower tube plate and extending away from the upper and lower tube plates for a second distance less than the first distance, said plane parts respectively welded to said upper tube plate reinforcement and said lower tube plate reinforcement and embossed parts thereof protruding toward the center of said oil passage being mutually abutted and welded together.

2. The structure as defined in claim 1, wherein said upper and lower tube plate reinforcements are formed longitudinally in said oil passage along a width direction of said plane parts.

3. The structure as defined in claim 1, wherein said upper and lower tube plate reinforcements comprise:
    welded coupling surfaces respectively abutted and welded to surfaces of said plane parts extended from said oil passage; and
    embossed parts protruding from a central portion of Welded coupling surfaces and distanced from said plane parts and protruding toward a center of said oil passage.

4. The structure as defined in claim 3, wherein said embossed parts are formed with straight plane parts and connected via slanted surfaces to the welded coupling surfaces.

5. The structure as defined in claim 1, wherein one marginal surface of said upper and lower tube plate reinforcements are arched, and other three marginal surfaces thereof are formed straight along longitudinal and crosswise directions of said plane parts.

6. An oil cooler structure of an automatic transmission, comprising:
    an upper tube plate and a lower tube plate together forming an oil circulation space defining oil holes at a top and a bottom;
    an oil passage defined by an upper tube plate plane part and a lower tube plate plane part, said oil passage communicating with said oil circulation space intermediate of said top and bottom oil holes and extending longitudinally for a first distance; and
    an upper tube plate reinforcement and a lower tube plate reinforcement secured to the upper tube plate and lower tube plate, respectively, and layered in said oil passage extending away from the upper and lower tube plates for a second distance less than the first distance, said plane parts being respectively secured to said upper tube plate reinforcement and said lower tube plate reinforcement and said reinforcements being secured together in a central part.

7. The structure as defined in claim 6, wherein said upper tube plate reinforcement and said lower tube plate reinforcement each have an inwardly curved end configured and dimensioned to mate with the upper and lower tube plates, respectively.

* * * * *